No. 857,273.  
PATENTED JUNE 18, 1907.
E. A. FORSBERG.  
CENTRIFUGAL CREAM SEPARATOR.  
APPLICATION FILED SEPT. 23, 1904.
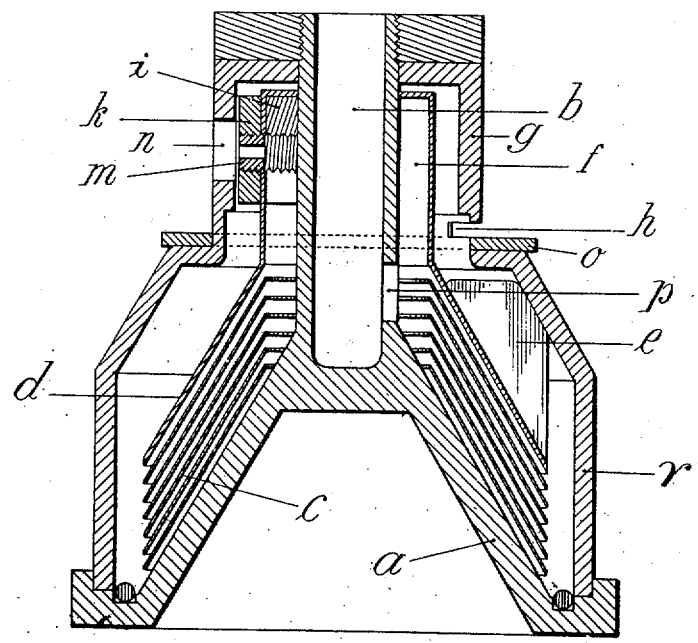
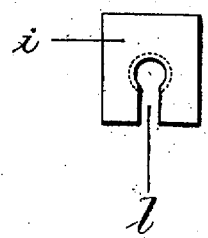

UNITED STATES PATENT OFFICE.

ERIK AUGUST FORSBERG, OF STOCKHOLM, SWEDEN, ASSIGNOR TO AKTIEBOLAGET SEPARATOR, OF STOCKHOLM, SWEDEN.

CENTRIFUGAL CREAM-SEPARATOR.

No. 857,273.      Specification of Letters Patent.      Patented June 18, 1907.

Application filed September 23, 1904. Serial No. 225,620.

*To all whom it may concern:*

Be it known that I, ERIK AUGUST FORSBERG, a subject of the King of Sweden, residing at Stockholm, Sweden, have invented certain new and useful Improvements in Liners for Centrifugal Cream-Separators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to centrifugal machines, and particularly liquid separators for separating whole milk into its constituents of skim milk and cream.

In one type of cream separator there is provided a liner or division contrivance consisting of superposed conical division plates, and above them an upper plate having an upwardly extending neck surrounding the feed tube, the separated skim milk being drawn off outside the upper plate through one or more suitable outlets, the separated cream rising within the upper plate and being drawn off through another outlet. In this type of cream separator the outlet or outlets for the skim milk are usually arranged in the shape of hollow screws, screwed into the bowl neck. By means of this screw, the relation between the quantities of the two fluids that are passed through the two different outlets, is regulated. Experience has shown, however, that there are certain inconveniences and disadvantages attached to the taking out of the skim milk through one or more regulating screws, chief among which is that the rapidity of discharge of the separated fluid becomes quite considerable on account of the small diameter of the discharge orifices, and this, again causes foam.

My invention has for its object to avoid this principal inconvenience or disadvantage, and it consists in arranging the outlet for the skim milk in the shape of one or more, preferably horizontal, slits in the bowl neck, through which the skim milk is freely passed into the surrounding vessel. The regulation of the relation between the two fluids is effected at the cream outlet, by means of a regulating screw engaging the wall of the neck of the upper plate.

The invention will be more fully understood by reference to the drawings, in which—

Figure 1 is a vertical section through a centrifugal separator bowl embodying my invention. Fig. 2 is a side view of the block through which the cream passes on its way to the cream outlet.

$a$ is the bottom of the bowl, $b$ the feed tube, $r$ the outer wall of the bowl.

$c$ represents the conical division plates.

$d$ is the upper plate composed of a lower conical portion having a shape and function similar to any of the plates $c$, and an upwardly extending neck extending within the neck of the bowl and surrounding the feed tube, and of a diameter substantially larger than the feed tube. The upper end of the neck of the feed tube tightly engages and embraces the feed tube.

$e$ is a wing secured to the upper plate and extending to and pressing against the inner wall of the bowl.

Immediately above the shoulder formed at the junction of the body and neck of the bowl, the neck $g$ of the bowl is provided with one or more horizontal outlet slits $h$ in the bowl neck. Immediately below this outlet slit is a lip $o$ consisting of an annular plate resting above the said shoulder. The object of this lip is to prevent any adherence of the fluid to the outer surface of the bowl.

Between the central feed tube and the neck of the upper plate is a block $i$, which, as shown in Fig. 2, is provided with a groove $l$, the upper part of which is enlarged and rounded. The enlarged rounded upper end of this groove is threaded and adapted to receive the cream screw.

Between the outer wall of the neck of the bowl and the neck of the upper plate, and outside the block $i$, is inserted a block $k$ having a threaded hole to receive the cream screw. The cream screw is provided with a central orifice, as usual. Opposite the block $k$ there is provided a hole $n$ in the bowl-neck.

The whole milk entering the central feed tube is thrown out through bottom opening $p$ into the separating chamber, and passes in between the plates, when the separation takes place in the well known manner. The separated skim milk is thrown to the periphery of the bowl and moves upward until it reaches the slit or slits $h$, through which it escapes into an appropriate and well known surrounding receiving vessel (not shown). The separated cream moves upward inside the neck of the upper plate, and is thrown out, through the regulating screw $m$ and hole $n$, into its well known receiving vessel (not shown). By screwing in the cream screw, the cream level can be regulated in the ordinary manner.

Having now fully described my invention, what I claim and desire to protect by Letters Patent is:

1. In a centrifugal cream separator, the combination of a centrifugal bowl provided with an unobstructed discharge for the skim milk, a liner therein consisting of superposed conical plates, an upper plate upon the liner, extending into the bowl neck and closed against the central feed tube of the bowl, and a hollow regulating screw connected with the upper plate for regulating the discharge of the cream and drawing it off from the inner space of the upper plate.

2. In a centrifugal cream separator, the combination of a centrifugal bowl provided with an unobstructed discharge for the skim milk, a liner therein consisting of superposed conical plates, an upper plate upon the liner, extending into the bowl-neck and closed against the central feed tube of the bowl, a block secured to the neck of the upper plate and a hollow regulating screw in said block for regulating the discharge of the cream and drawing it off from the inner space of the upper plate.

3. In a centrifugal cream separator, the combination of a centrifugal bowl provided with an unobstructed discharge for the skim milk, a liner therein consisting of superposed conical plates, an upper plate upon the liner, extending into the bowl neck and closed against the central feed tube of the bowl, a block secured to the neck of the upper plate, an orifice in the said upper plate and a hollow regulating screw in the said block, the hole in the regulating screw alining with the orifice in the upper plate.

4. In a centrifugal cream separator, the combination of a centrifugal bowl provided with an unobstructed discharge for the skim milk, a liner therein consisting of superposed conical plates, an upper plate upon the liner, extending into the bowl-neck, and closed against the central feed tube of the bowl, and a hollow regulating screw in the upper plate for regulating the discharge of the cream and drawing it off from the inner space of the upper plate.

5. In a centrifugal cream separator, the combination of a centrifugal bowl provided with an unobstructed discharge for the skim milk, a liner therein consisting of superposed conical plates, an upper plate upon the liner, extending into the bowl-neck and closed against the central feed tube of the bowl, the neck of the bowl being provided with a slit for the discharge of the skim-milk and the upper plate provided with a hollow regulating screw for regulating the discharge of the cream and drawing it off from the inner space of the upper plate.

In testimony, that I claim the foregoing as my invention, I have signed my name in presence of two subscribing witnesses.

ERIK AUGUST FORSBERG.

Witnesses:
 GUSTAF ALSON,
 KOUR. DAHLQUIST.